(12) United States Patent
Misawa

(10) Patent No.: US 12,106,532 B2
(45) Date of Patent: Oct. 1, 2024

(54) INSPECTION APPARATUS, CONTROL METHOD, AND INSPECTION METHOD

(71) Applicant: CANON KABUSHIKI KAISHA, Tokyo (JP)

(72) Inventor: Reiji Misawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/929,553

(22) Filed: Sep. 2, 2022

(65) Prior Publication Data

US 2023/0070196 A1    Mar. 9, 2023

(30) Foreign Application Priority Data

Sep. 8, 2021  (JP) .................................. 2021-146111

(51) Int. Cl.
```
G06F 3/12      (2006.01)
G06V 10/24     (2022.01)
G06V 30/14     (2022.01)
G06V 30/16     (2022.01)
G06V 30/244    (2022.01)
H04N 1/00      (2006.01)
```
(52) U.S. Cl.
CPC ........ *G06V 10/242* (2022.01); *G06V 30/1456* (2022.01); *G06V 30/16* (2022.01); *G06V 30/245* (2022.01); *H04N 1/00824* (2013.01)

(58) Field of Classification Search
CPC .. G06V 10/242; G06V 30/1456; G06V 30/16; G06V 30/245; H04N 1/00824
See application file for complete search history.

(56) References Cited

U.S. PATENT DOCUMENTS

| | | | | |
|---|---|---|---|---|
| 2004/0086156 A1* | 5/2004 | Furukawa | ............ | H04N 1/6052 |
| | | | | 382/218 |
| 2013/0322759 A1* | 12/2013 | Qiu | ...................... | G06V 30/245 |
| | | | | 382/182 |
| 2014/0254886 A1* | 9/2014 | Plettinck | ............... | G06F 3/1244 |
| | | | | 382/112 |
| 2020/0019353 A1* | 1/2020 | Okajima | ............... | G06F 3/1257 |
| 2020/0288030 A1* | 9/2020 | Tsukamoto | ........ | H04N 1/00803 |
| 2022/0116504 A1* | 4/2022 | Tsukamoto | ........... | G06T 1/0007 |

FOREIGN PATENT DOCUMENTS

JP          2006238106 A      9/2006

* cited by examiner

*Primary Examiner* — Huo Long Chen
(74) *Attorney, Agent, or Firm* — Canon U.S.A., Inc. IP Division

(57) ABSTRACT

An inspection apparatus selects at least one character area, in a first preview image obtained by reading and previewing a print product, sets a direction, for a character in the selected character area, registers the set direction and the character in the selected character area in association with each other, selects at least one character inspection area, in a second preview image obtained by reading and previewing a print product as an inspection target, sets a direction, for a character in the selected character inspection area, rotates the character inspection area to match the set direction, with the direction set for the character in the selected character area, performs character recognition, for the character in the rotated character inspection area, and inspects the character inspection area, based on a result of the character recognition and a result of recognizing the character in the selected character area.

14 Claims, 14 Drawing Sheets

FIG.11A

GLYPH REGISTRATION SETTING

| PATTERN | 1101 | 1102 | 1103 | 1104 |
|---|---|---|---|---|
| ANGLE INFORMATION | 0° | 90° | 180° | 270° |

FIG.11B

BARCODE REFERENCE DIRECTION

| PATTERN | 1105 |
|---|---|
| ANGLE INFORMATION | 0° |

FIG.12
INSPECTION SETTING
| | 1201 | 1202 | 1203 | 1204 |
|---|---|---|---|---|
| PATTERN |  | 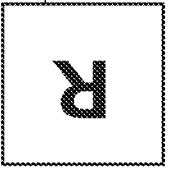 | 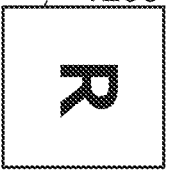 | 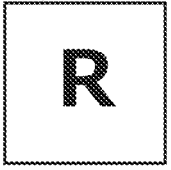 |
| ANGLE INFORMATION | 0° | 90° | 180° | 270° |

FIG.14
INSPECTION SETTING
| | 1401 | 1402 | 1403 | 1404 |
|---|---|---|---|---|
| PATTERN | 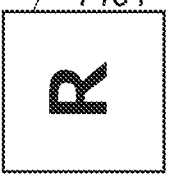 | 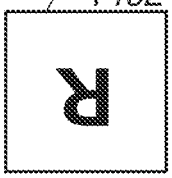 | 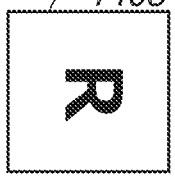 | 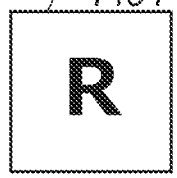 |
| ANGLE INFORMATION | 90° | 180° | 270° | 0° |

# INSPECTION APPARATUS, CONTROL METHOD, AND INSPECTION METHOD

BACKGROUND

Field of the Disclosure

The present disclosure relates to an image forming apparatus, an inspection apparatus, an inspection system, and an inspection method, and particularly relates to a data inspection method for inspecting a variable area portion such as a character string or a barcode in variable printing.

Description of the Related Art

Apparatus that automatically perform inspection as post-processing of a printing machine are known. In such an inspection apparatus, first, correct image data is registered. Subsequently, an image forming apparatus prints input image data on a sheet, and an inspection sensor of the inspection apparatus reads the data printed on the sheet. The image data read by the inspection sensor and the correct image data registered first are compared, so that a defect of a print product is detected. The inspection for detecting a defect of a pattern portion of the print product will be referred to as "printed image inspection".

Along with the printed image inspection, inspection of a variable area portion such as a character string is also performed in variable printing. Examples of such inspection include data inspection in which a character string obtained by optical character recognition (OCR) is collated with correct data. To perform the OCR accurately, it is desirable to perform character recognition in an appropriate orientation of a character. For example, in Japanese Patent Application Laid-Open No. 2006-238106, a method is discussed in which a user adjusts the orientation of a document while a preview image is displayed.

SUMMARY

In data inspection in variable printing, it is desirable for a user to set not only the direction (angle) of a character for an inspection but also the direction (angle) of a character at a time of glyph (character shape) registration. If the direction (angle) of the character in the glyph registration and the direction (angle) of the character at a time of actual inspection are set as different directions (angles), the character cannot be accurately recognized.

According to an aspect of the present disclosure, an inspection apparatus includes a first selection unit configured to select at least one character area in a first preview image obtained by reading and previewing a print product, a first setting unit configured to set a direction for a character in the character area selected by the first selection unit, a registration unit configured to register the direction set by the first setting unit and the character in the selected character area in association with each other, a second selection unit configured to select at least one character inspection area in a second preview image obtained by reading and previewing a print product as an inspection target, a second setting unit configured to set a direction for a character in the character inspection area selected by the second selection unit, a rotation unit configured to rotate the character inspection area to match the direction set by the second setting unit with the direction set by the first setting unit, a recognition unit configured to perform character recognition for the character in the character inspection area rotated by the rotation unit, and an inspection unit configured to inspect the character in the character inspection area, based on a result of the character recognition by the recognition unit and a result of recognizing the character in the character area selected by the first selection unit.

Further features of the present disclosure will become apparent from the following description of exemplary embodiments with reference to the attached drawings.

BRIEF DESCRIPTION OF THE DRAWINGS

FIG. 11A illustrates an angle information table for glyph registration. FIG. 11B illustrates an angle information table for a barcode.

FIG. 12 illustrates an angle information table for inspection setting.

FIG. 14 illustrates an angle information table for inspection setting according to one or more aspects of the present disclosure.

DESCRIPTION OF THE EMBODIMENTS

Exemplary embodiments of the present disclosure will be described below with reference to the drawings. Components to be described in these exemplary embodiments are only examples and are not intended to limit the scope of the present disclosure to these exemplary embodiments.

Figure 1:
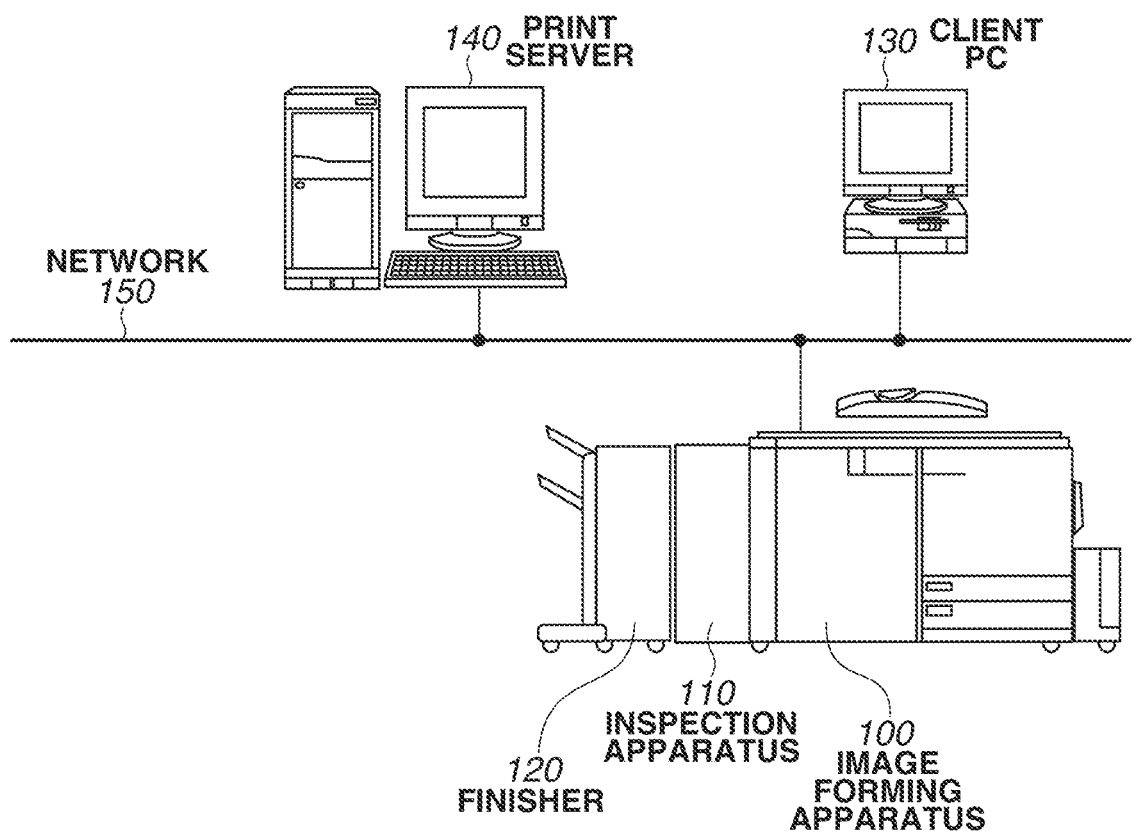
FIG. 1 is a diagram illustrating an example of a system configuration including an inspection apparatus according to one or more aspects of the present disclosure.

FIG. 1 is a diagram illustrating a system configuration including an inspection apparatus according to a first exemplary embodiment of the present disclosure.

FIG. 1 illustrates an image forming apparatus 100, an inspection apparatus 110, a finisher 120, a client personal computer (PC) 130, a print server 140, and a network 150.

The image forming apparatus 100 performs print output, based on various input data, e.g., print data transmitted from the client PC 130 or the print server 140.

The inspection apparatus 110 performs inspection as to whether a print product output from the image forming apparatus 100 has a defect. Here, the defect is referred to as the cause of a reduction in the quality of the print product. Examples of the defect include dirt caused by attachment of a color material to an unintended point in printing, and a color omission caused by the lack of attachment of a sufficient amount of a color material to an intended point.

The inspection apparatus 110 also performs inspection of a variable area portion, such as a character string or a barcode in variable printing. Examples of the inspection include data readability inspection of checking whether a character string or barcode can be read, and data collation inspection of collating a result of reading a character string or barcode with correct data. In other words, the inspection apparatus 110 performs printed image inspection and data inspection as described above.

The finisher 120 receives an output sheet inspected by the inspection apparatus 110, changes a sheet discharge destination based on an inspection result from the inspection apparatus 110, performs post-processing (e.g., binding) as appropriate, and discharges the sheet.

The image forming apparatus 100 is connected to the client PC 130 and the print server 140 via the network 150, and also connected to the inspection apparatus 110 and the finisher 120 via communication cables. The inspection apparatus 110 is connected to the finisher 120 via a communication cable, besides being connected to the image forming apparatus 100. The present exemplary embodiment illustrates an in-line inspection machine that performs operations from image formation, inspection, post-processing, up to sheet discharge.

[Block Diagram of Image Forming Apparatus]

Figure 2:
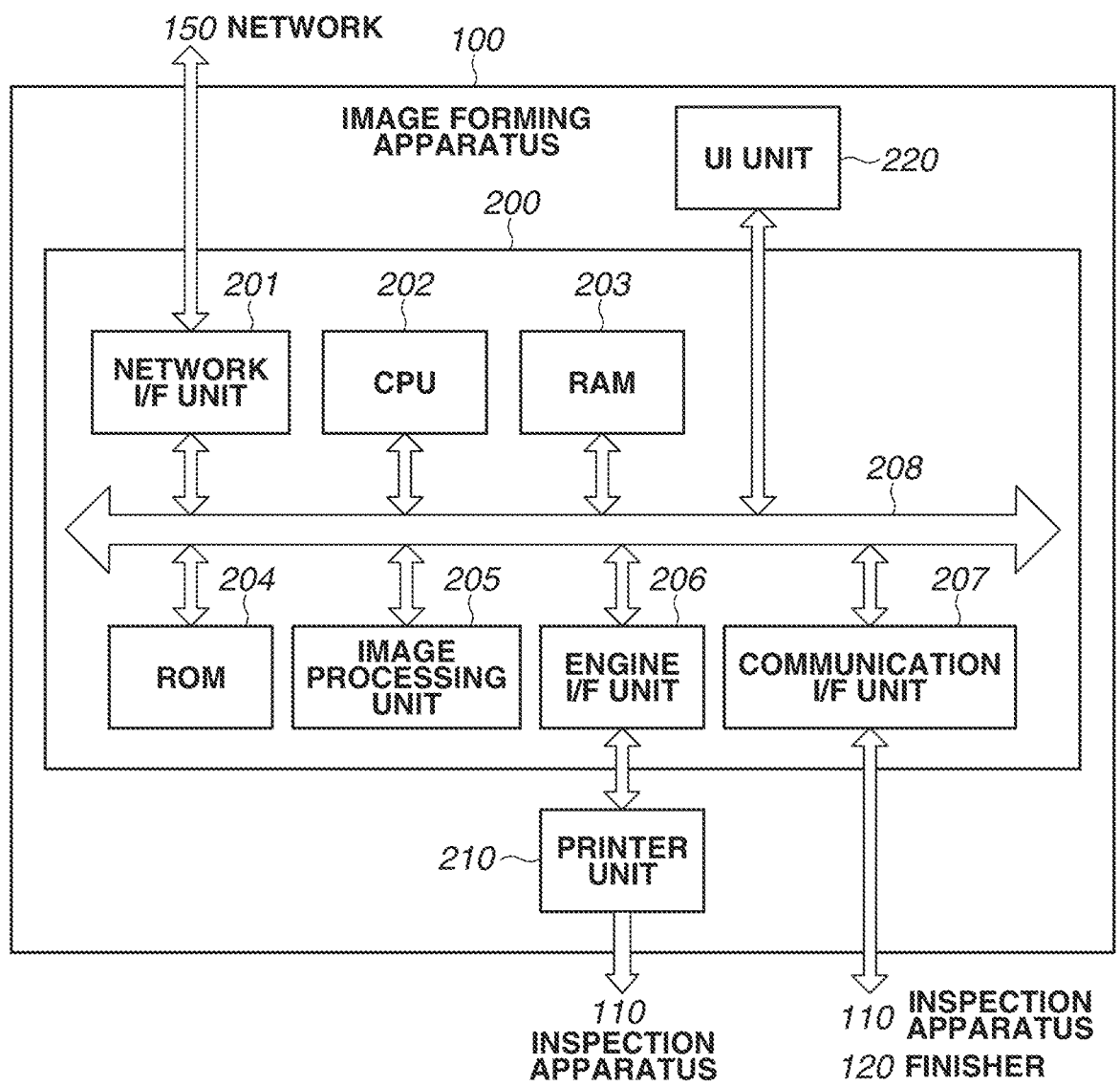
FIG. 2 is an internal block diagram illustrating an image forming apparatus according to one or more aspects of the present disclosure.

FIG. 2 is a diagram illustrating an internal configuration of the image forming apparatus 100 according to the present exemplary embodiment.

A controller 200 receives an image or document from the network 150, and converts the received image or document into print data. A printer unit 210 prints print data on a sheet. A user interface (UI) unit 220 is provided for a user to give an instruction, such as selection of sheet information, to the image forming apparatus 100. The image forming apparatus 100 is composed of the controller 200, the printer unit 210, and the UI unit 220 described above.

Components of the controller 200 are as follows. A network interface (I/F) unit 201 is provided to transmit and receive data to and from the network 150. A central processing unit (CPU) 202 controls the entire image forming apparatus 100. A random access memory (RAM) 203 is used as a work area when the CPU 202 executes various commands. A read only memory (ROM) 204 stores, for example, program data to be executed by the CPU 202 at start-up, and setting data of the controller 200. An image processing unit 205 converts image or document data received from the network 150 into print data. An engine I/F unit 206 is provided to transmit print data to the printer unit 210. A communication I/F unit 207 is provided to communicate with the inspection apparatus 110 and the finisher 120. An internal bus 208 is a system bus.

An image or document created on the client PC 130 or the print server 140 on the network 150 is transmitted to the image forming apparatus 100 via a network (e.g., a local area network) as page-description language (PDL) data. The transmitted PDL data is stored in the RAM 203 via the network I/F unit 201. A print instruction given by the user at the UI unit 220 is also stored in the RAM 203 via the internal bus 208. Examples of the print instruction given by the user include a selection of a sheet type.

The image processing unit 205 acquires the PDL data stored in the RAM 203, and performs image processing of converting the PDL data into print data. The image processing of converting the PDL data into the print data is, for example, to rasterize the PDL data, convert the rasterized data into multi-value bitmap data, and perform screen processing, thereby converting the PDL data into binary bitmap data. The binary bitmap data obtained by the image processing unit 205 is transmitted to the printer unit 210 via the engine I/F unit 206.

The printer unit 210 prints the received binary bitmap data on a sheet using a color material. The CPU 202 issues an instruction to the printer unit 210, based on the print instruction given by the user that is stored in the RAM 203. For example, in a case where an instruction to print on coated paper is given by the user, the CPU 202 instructs the printer unit 210 to output a sheet from a sheet cassette (not illustrated) storing coated paper in the image forming apparatus 100. The above-described various processes ranging from the reception of the PDL data to the printing on the sheet are controlled by the CPU 202, so that a full color toner image is formed on the sheet.

[Internal Configuration of Inspection Apparatus 110]

Figure 3:
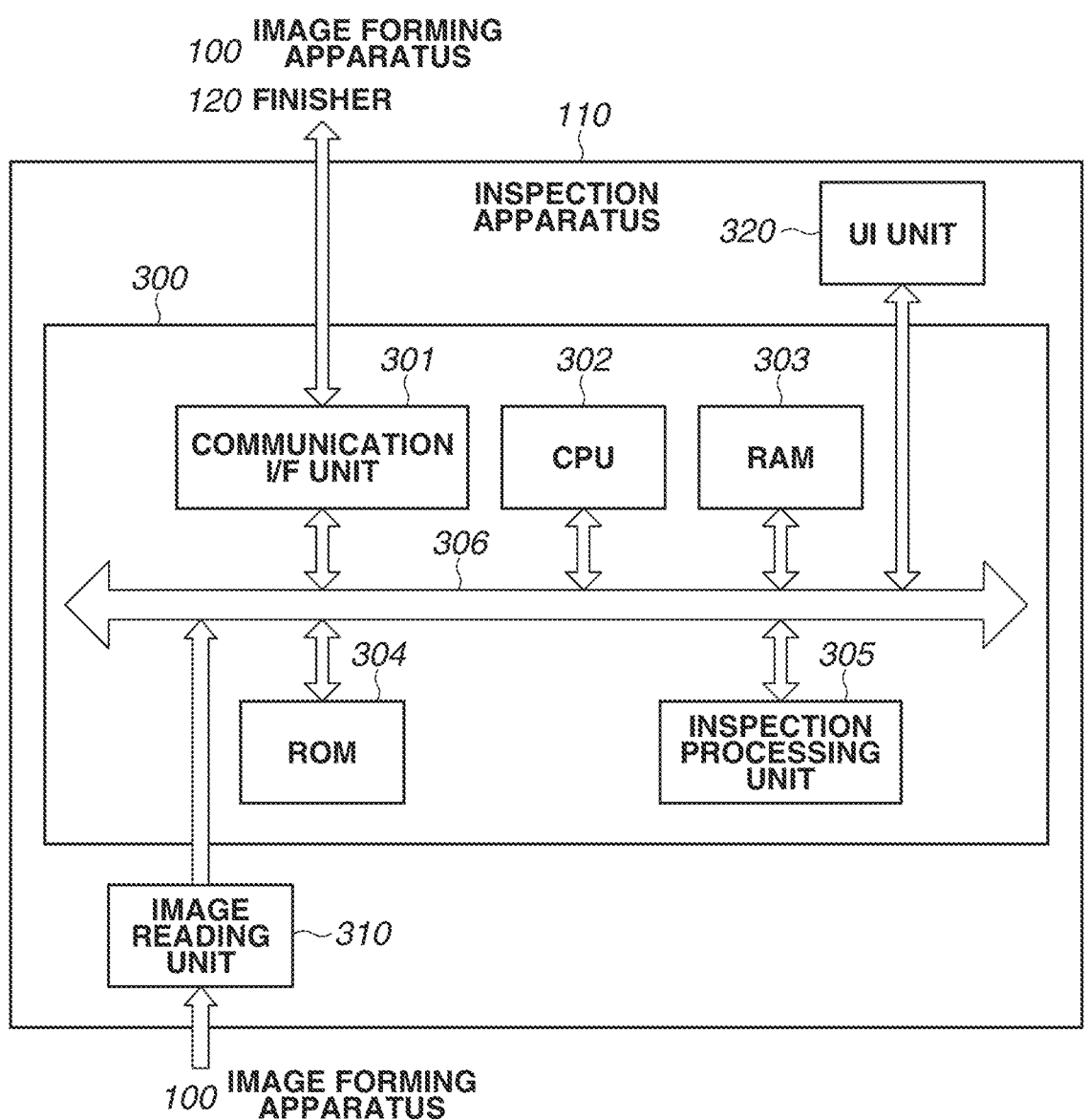
FIG. 3 is an internal block diagram illustrating the inspection apparatus according to one or more aspects of the present disclosure.

FIG. 3 illustrates an internal configuration of the inspection apparatus 110.

An inspection control unit 300 controls the entire inspection apparatus 110, and performs inspection as to whether a print product has a defect and inspection of a variable area portion, such as a character string or a barcode. An image reading unit 310 reads a print product conveyed from the image forming apparatus 100. A UI unit 320 is provided for a user to make setting of the inspection apparatus 110 and to display an inspection result for the user. Here, the setting of the inspection apparatus 110 made by the user is an inspection item indicating what type of defect is to be inspected when a print product is inspected. Examples of the inspection item include a circular defect (dot), a linear defect (streak), and correctness/incorrectness determination for a variable area portion, such as a character string or barcode. The inspection apparatus 110 is composed of the inspection control unit 300, the image reading unit 310, and the UI unit 320 described above.

Components of the inspection control unit 300 are as follows. A communication I/F unit 301 is provided for data communication with the image forming apparatus 100 and the finisher 120. A CPU 302 controls the entire inspection apparatus 110. A RAM 303 is used as a work area when the CPU 302 executes various commands. A ROM 304 stores, for example, program data to be executed by the CPU 302 at start-up, and setting data of the inspection control unit 300. An inspection processing unit 305 inspects whether a print product has a defect. An internal bus 306 is a system bus.

Next, an outline of inspection to be performed by the inspection apparatus 110 will be described.

In the inspection apparatus 110, the image reading unit 310 reads a print product conveyed from the image forming apparatus 100 to acquire a scanned image as an inspection target. The acquired scanned image as the inspection target is stored in the RAM 303.

Subsequently, in the inspection apparatus 110, the inspection processing unit 305 calculates a differential value between a reference image stored beforehand in the RAM 303 as a correct image and the scanned image stored as the inspection target.

The inspection apparatus 110 then performs inspection by comparing the calculated differential value and an inspection threshold (contrast and size) of each inspection item, pixel by pixel. The result of the inspection is stored in the RAM 303, and the result of the inspection include information as to whether a print product has a defect, the type (dot or streak) of a detected defect, and position information about the position of a defect when displayed on the UI unit 320.

In the inspection apparatus 110, the CPU 302 instructs the UI unit 320 to display the inspection result stored in the RAM 303. The inspection result is displayed on the UI unit 320, so that the user recognizes the inspection result.

In a case where a print product having a defect is produced as each of a predetermined number or more of pages in succession, the inspection apparatus 110 causes the CPU 302 to transmit the above-described information to the image forming apparatus 100 via the communication I/F unit 301.

The controller 200 receives information indicating that print products each having a defect are produced in succession, via the communication I/F unit 207. When the controller 200 receives such information, the CPU 202 instructs the printer unit 210 to suspend printing. Since the printer unit 210 is instructed to suspend printing, the image forming apparatus 100 suspends a print operation.

Further, in the inspection apparatus 110, the CPU 302 also transmits information to the finisher 120 via the communication I/F unit 301, based on the inspection result stored in the RAM 303. The information transmitted to the finisher 120 is information as to whether a print product has a defect. Using the received information, the finisher 120 discharges a print product having no defect to a normal sheet discharge tray and a print product having a defect to a tray different from the normal sheet discharge tray.

Figure 4:
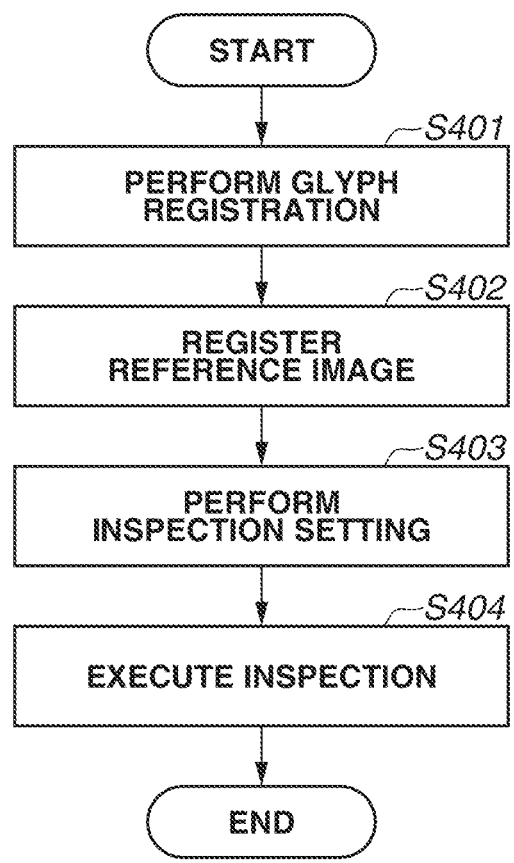
FIG. 4 illustrates a flowchart of an inspection process.

An overall processing flow ranging from registration work before inspection start to inspection execution will now be described with reference to a flowchart in FIG. 4.

In step S401, the user registers glyph (character shape) in the ROM 304 or the RAM 303 of the inspection apparatus 110. In the glyph registration in step S401, a glyph font is created. The glyph font is data indicating a correspondence between a character glyph image to be used for character recognition (optical character recognition (OCR)) to be performed in data inspection and a character code. The user starts reading of a glyph font image with the inspection apparatus 110, and executes a print job for creating a glyph font with the client PC 130.

Figure 5:
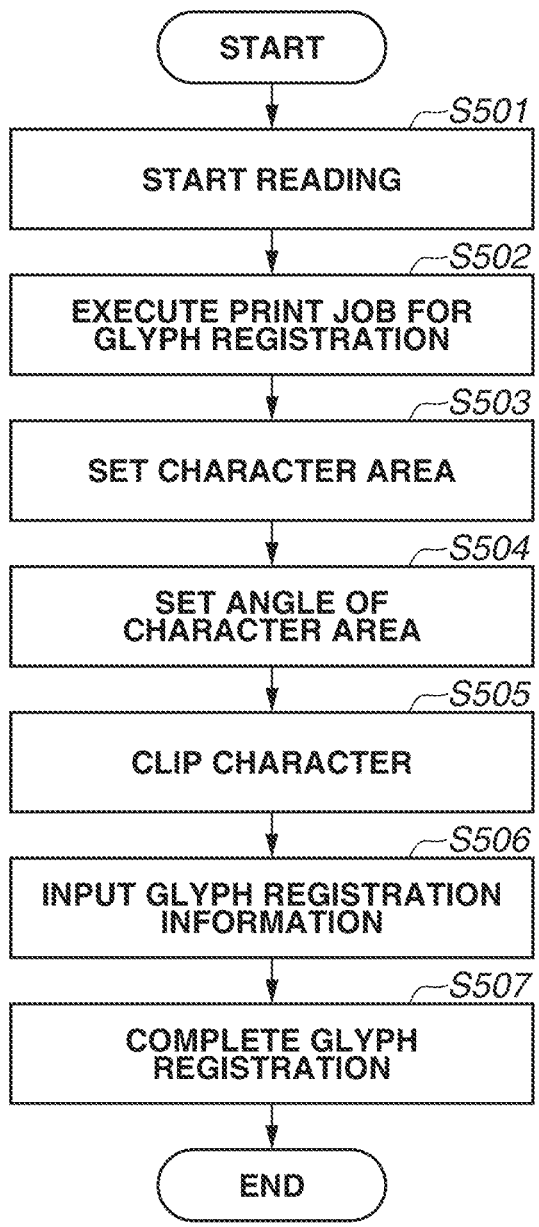
FIG. 5 illustrates a flowchart of glyph registration.

The details of the glyph registration will be described with reference to FIG. 5.

In step S402, the user registers a reference image to be a reference for inspection, in the ROM 304 or the RAM 303 of the inspection apparatus 110. The user starts reading of a reference image with the inspection apparatus 110, and executes a print job for registering the reference image with the client PC 130.

In step S403, the user performs inspection setting to set various inspection parameters, an inspection area, and an inspection level.

In step S404, the user starts inspection with the inspection apparatus 110, and executes a print job for inspection (an inspection target) with the client PC 130. When printing is executed, the inspection apparatus 110 detects conveyance of a sheet, scans the sheet using the image reading unit 310, and the scanned image is stored in the RAM 303 of the inspection apparatus 110. The stored image is compared with the reference image, so that an inspection result is obtained.

The details of the glyph registration will now be described with reference to a flowchart in FIG. 5 and diagrams in FIGS. 7 and 8.

In the glyph registration, a character string image area is set for an arbitrary image for glyph registration, and a character code is associated with each character image in the area.

Figure 7:
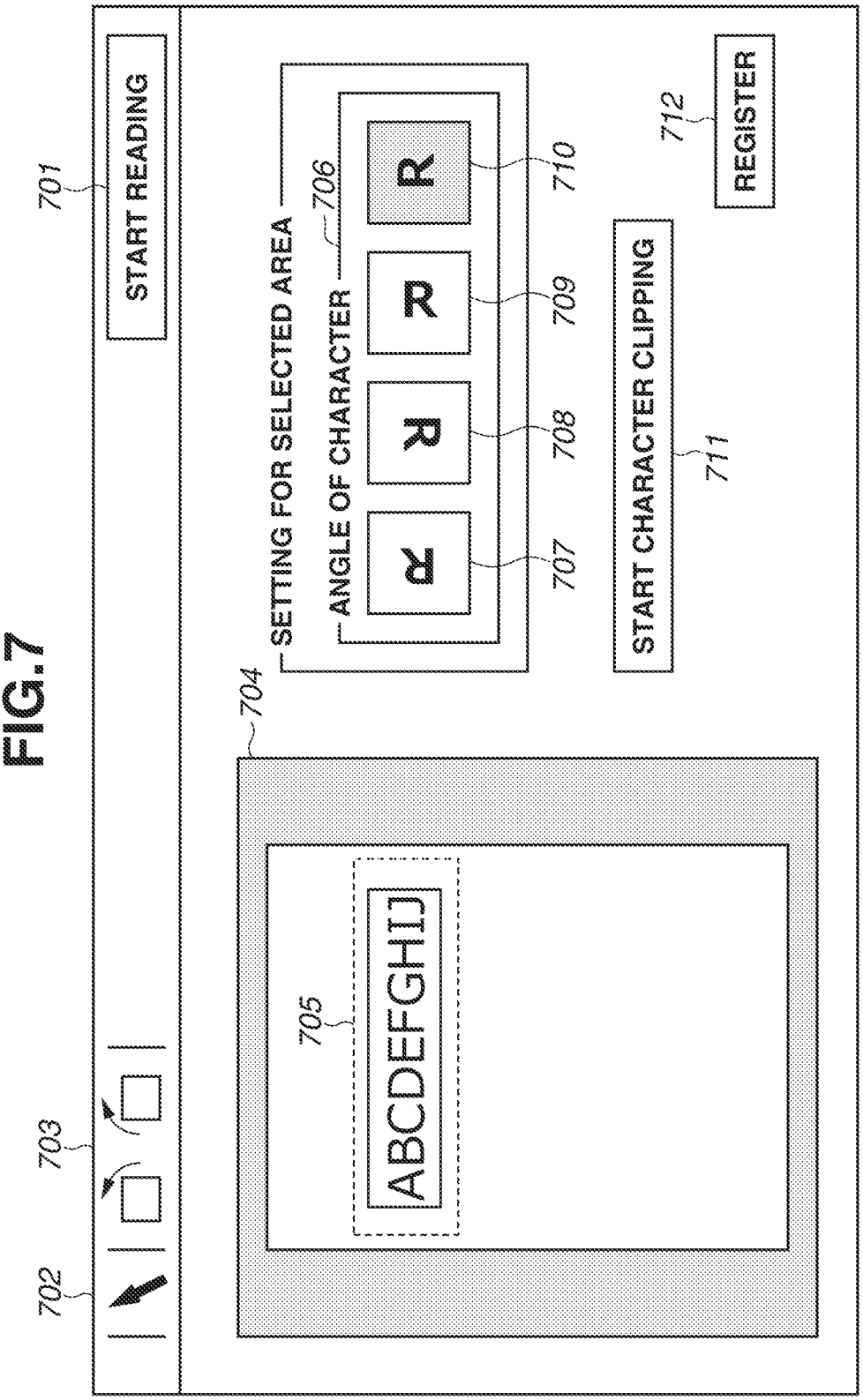
FIG. 7 illustrates a first example of a user interface (UI) screen for glyph registration.

FIG. 7 illustrates a UI screen for glyph registration displayed on the UI unit 320 of the inspection apparatus 110. A button 701 is provided to start reading, a button 702 is for selecting a character area, and a button 703 is for rotating a page preview.

A display window 704 displays an image for glyph registration. A character area 705 is an area selected using the button 702 for selecting the character area. In FIG. 7, a group of characters "ABCDEFGHIJ" is selected as a character area for glyph registration, as an example.

A setting item 706 is for the selected area, and provided for selecting a button from direction setting buttons 707 to 710 each indicating the direction (angle) of a character. The user checks the character area 705, and selects a direction setting button corresponding to the same direction as the direction (angle) of the displayed character from the direction setting buttons 707 to 710.

Setting of the direction (angle) of the character will now be described in detail.

As described above, if the direction (angle) of the character in the glyph registration and the direction (angle) of the character in the inspection setting to be described below are set as different directions, the character cannot be accurately recognized in real inspection. Thus, it is desirable to correctly set the direction (angle) of the character in the glyph registration.

As the way of setting the direction (angle) of the character, the user views the character area 705 and selects the direction setting button corresponding to the same direction as the direction (angle) of the character displayed in the character area. Here, angle information (e.g., 0 degrees, 90 degrees, 180 degrees, or 270 degrees) about the character may be directly selected, but it may be difficult for the user to select the angle information while viewing the direction (angle) of the displayed character.

For example, in a case where setting is performed based on a sheet conveyance direction, the conveyance direction is the left direction from the UI screen for glyph registration in FIG. 7, and thus it is desirable to set the direction indicated by the direction setting button 707 to 0 degrees. In this case, the direction indicated by the direction setting button 708 is rotated counterclockwise 90 degrees from the direction indicated by the direction setting button 707, and thus it is desirable to set the direction indicated by the direction setting button 708 to 90 degrees. The direction indicated by the direction setting button 709 is rotated counterclockwise 180 degrees from the direction indicated by the direction setting button 707, and thus it is desirable to set the direction indicated by the direction setting button 709 to 180 degrees. The direction indicated by the direction setting button 710 is rotated counterclockwise 270 degrees from the direction indicated by the direction setting button 707, and thus it is desirable to set the direction indicated by the direction setting button 710 270 degrees. In this way, it may be difficult for the user to select the angle information.

In the present exemplary embodiment, the user selects the direction setting button corresponding to the same direction as the direction (angle) of the character. The direction setting button 710 being selected by the user is displayed in the setting item 706.

Here, the direction setting buttons 707 to 710 each have angle information in a table illustrated in FIG. 11A. The direction setting buttons 707 to 710 correspond to direction setting buttons 1101 to 1104, and to 0 degrees, 90 degrees, 180 degrees, and 270 degrees, respectively, indicated as the angle information. The angle information is used at the time of inspection to be described below. The set angle (orientation) of the character is associated with the character in the selected area.

In the present exemplary embodiment, the angle to be set is based on 90-degree increments, and the angle is based on the sheet conveyance direction. As described above, the sheet conveyance direction is the left direction viewed from the UI screen for glyph registration in FIG. 7, and thus the angle information corresponding to the direction setting button 1101 is 0 degrees.

The setting indicating the direction (angle) of the character is not limited to the direction setting buttons 707 to 710, and may be, for example, radio buttons.

Figure 8:
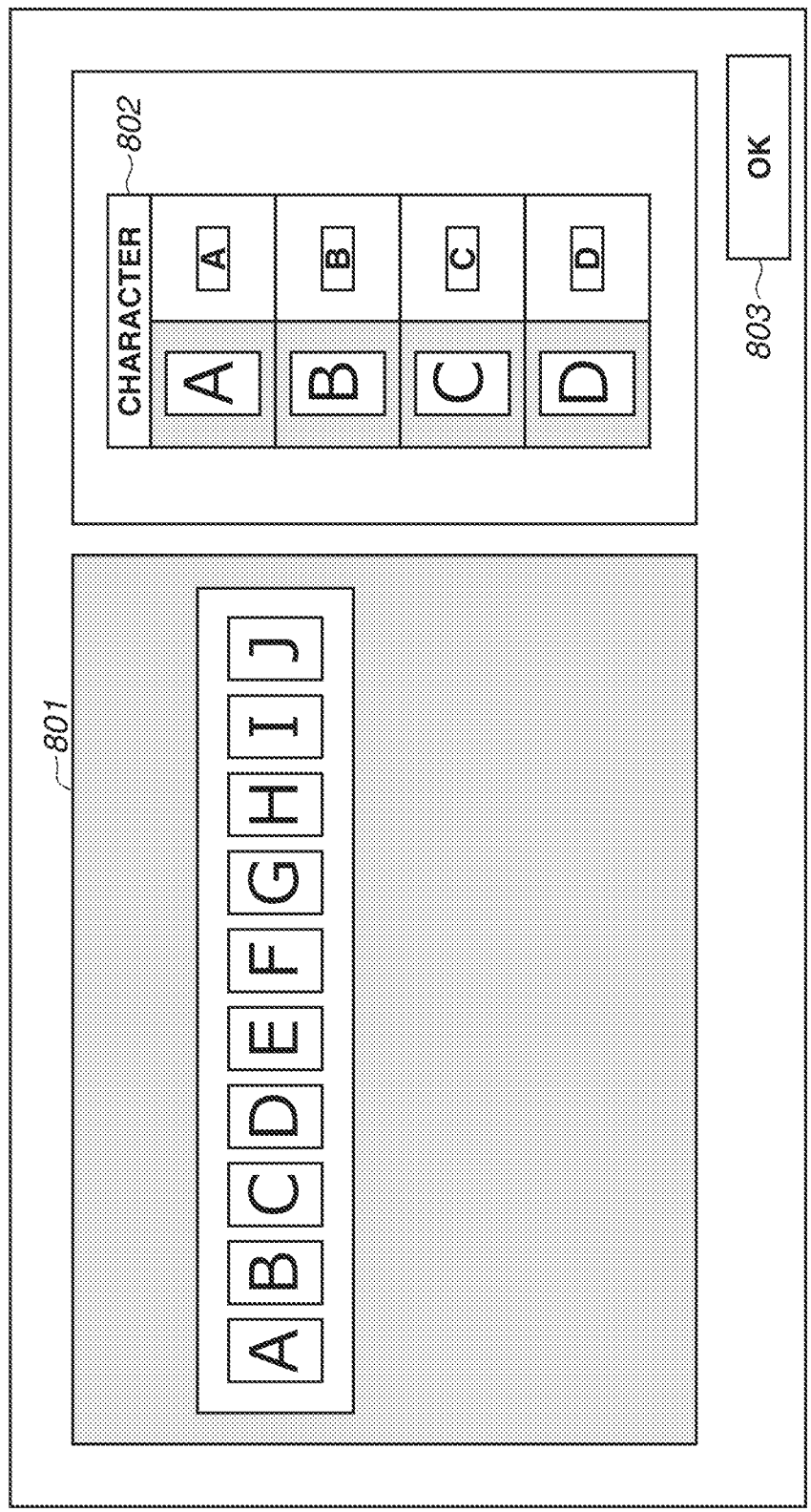
FIG. 8 illustrates a second example of a UI screen for glyph registration.

A button 711 is for starting character clipping, and the button 711 brings transition to a character clipping screen in FIG. 8 when pressed. A registration button 712 is provided to complete the glyph registration.

FIG. 8 illustrates the character clipping screen. A window 801 displays an image of a clipped character area, as a preview. A text box 802 is for inputting a separated character image of the character area and a character to be associated with the separated character image. When an OK button 803 is pressed after inputting the glyph registration information is completed, the character clipping screen is closed and the character clipping screen transitions to the UI screen for glyph registration illustrated in FIG. 7.

The flowchart in FIG. 5 will now be described with reference to FIGS. 7 and 8 described above.

In step S501, the user presses the button 701 to start reading.

When the button 701 to start reading is pressed, the inspection apparatus 110 enters a state of waiting to accept a scanned image based on a print job. Afterward, the scanned image is read when the print job is executed.

In step S502, the user executes the print job for glyph registration with the client PC 130. In step S503, the user sets the character area using the button 702 for selecting the character area, on the preview screen of the read image.

In step S504, the user sets the angle of the character area, using the setting item 706 for setting the angle of the character area. Specifically, the button corresponding to the same direction as the direction (angle) of the character is selected from the direction setting buttons 707 to 710.

In step S505, the user presses the button 711 for starting the character clipping. When the button 711 is pressed, the screen transitions to the character clipping screen illustrated in FIG. 8.

In step S506, the user inputs the glyph registration information by inputting a character in the text box 802 for inputting a character to be associated with the separated character image. For example, in the case of the leftmost character "A", the user inputs the character "A" in the uppermost field of the text box 802.

The character "A" of the separated character image and the character code "A" are thereby associated with each other. When the OK button 803 is pressed after the glyph registration information is input, the screen transitions to the UI screen for glyph registration illustrated in FIG. 7.

In step S507, when the user presses the registration button 712, the glyph registration is completed. The user performs the glyph registration by carrying out the above-described work.

The details of the registration of the reference image will now be described.

The reference image is a scanned image of a print product determined by the user to be a print product having no defect. An operation of the inspection apparatus 110 when the scanned image is registered as the reference image for the inspection apparatus 110 will be described. First, the user visually inspects whether a print product produced by the image forming apparatus 100 has a defect, and the user registers a scanned image (an image that has been already scanned) of the print product as a reference image if the print product is determined to be a product having no defect.

The inspection apparatus 110 displays the scanned image on the UI unit 320. The user then confirms whether the scanned image displayed on the UI unit 320 has no problem. If the user confirms that the scanned image has no problem, the user presses a registration button (not illustrated) on the UI unit 320.

The inspection apparatus 110 stores the scanned image for which registration has been ordered by the user in the RAM 303, as the reference image to be used by the inspection processing unit 305. The scanned image is registered, through such work, as the reference image for the inspection apparatus 110.

Figure 6:
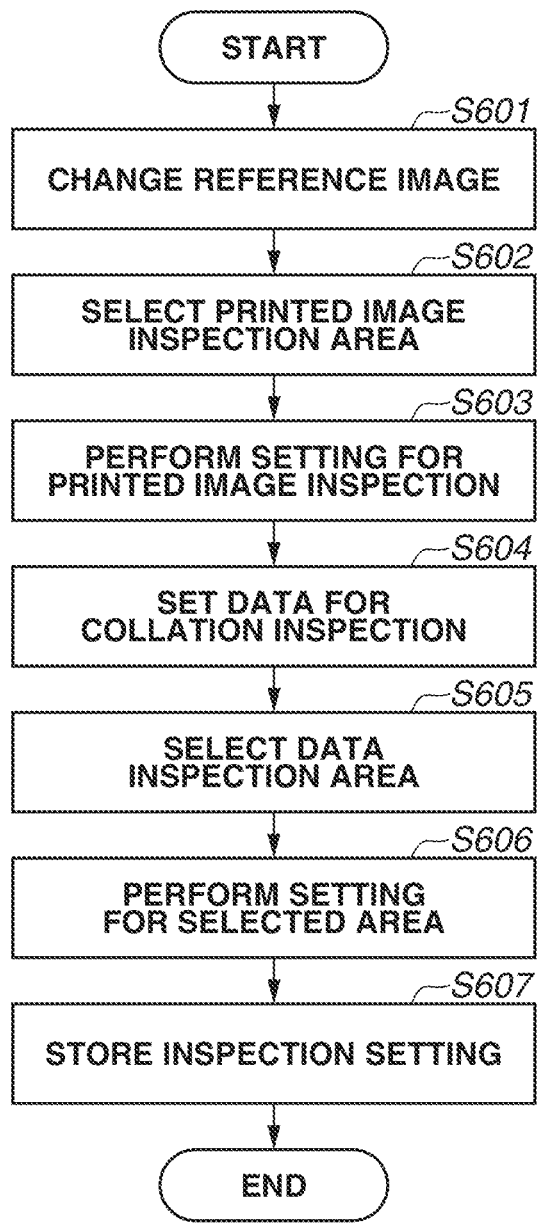
FIG. 6 illustrates a flowchart of inspection setting.

The details of the inspection setting will now be described with reference to a flowchart in FIG. 6 and a diagram in FIG. 9.

At this point, the glyph registration to be used for inspection and the registration of the reference image are completed.

First, the inspection setting to be performed by the user to execute the inspection will be described with reference to FIG. 9. FIG. 9 is an example of a UI screen for inspection setting displayed by the UI unit 320.

A button 901 is for changing a reference image and is used when the reference image is changed. A button 902 is for selecting an inspection area. A rotation button 903 is for rotating a page preview.

A display window 904 displays a reference image. An area 905 is a printed image inspection area selected with the button 902 for selecting the inspection area. The printed image inspection area is an inspection area for detecting a defect of a pattern portion of a print product.

A setting item 906 is for printed image inspection, and a setting item 907 is for an inspection area. The setting item 907 for the inspection area includes an inspection item for setting what type of defect is to be inspected, and an inspection level indicating to what degree a defect to be inspected is minute, when a print product is inspected. The inspection item is each of a circular defect (dot) and a linear defect (streak), for example. For the inspection level, for example, there are five levels from a level 1 to a level 5, and a thinner and smaller defect can be detected in the level 5 than in the level 1. Further, the level can be set for each of the inspection items, e.g., the inspection level 5 for "dot", and the inspection level 4 for "streak". As indicated in the setting item 907, the level 4 is selected as the inspection level setting for the defect (dot), and the level 4 is selected as the inspection level setting for the defect (streak), by the user. This setting item is related to the printed image inspection area, and the setting item related to a data inspection area will be described below.

Data inspection areas 908 and 917 are each selected using the button 902 for selecting the inspection area. The data inspection area 908 is a character inspection area, and the data inspection area 917 indicates a one-dimensional barcode as an example. A two-dimensional barcode such as a QR Code® can be recognized even if the direction (angle) is not particularly set, and therefore, the one-dimensional barcode for which it is desirable to set the direction (angle) will be described in the present exemplary embodiment.

A setting item 909 is for data inspection, i.e., character/barcode inspection. A setting item 910 is for selecting data to be used for collation inspection, by file selection. The data for collation inspection is a reference CSV file for data inspection to be collated when data inspection is performed. The reference CSV file is a file to be prepared beforehand by the user, and correct character strings for character string inspection and barcode inspection are listed in this file. A character string inspection area and a barcode reading result are collated with the correct character strings listed in the reference CSV file when data inspection is executed. In FIG. 9, "abc.csv" is selected by the user as the data for collation inspection.

A setting item 911 is for the selected area, and is provided to select direction setting buttons 912 to 915 each indicating the direction (angle) of a character/barcode.

Here, setting of the direction (angle) of the character/barcode will be described in detail. As described above, it is desirable to correctly set not only the direction (angle) of the character in the glyph registration, but also the direction (angle) of the character/barcode in the inspection setting. For example, the character recognition is thereby performed only for the set angle, which makes it unnecessary to perform the character recognition (OCR) in all directions, so that the speed for OCR improves.

As the way of setting the direction (angle) of the character, the user views the character in the data inspection area 908 and selects the direction setting button corresponding to the same direction as the direction (angle) of the displayed character. Here, angle information (e.g., 0 degrees, 90 degrees, 180 degrees, or 270 degrees) about the character may be directly selected, but it may be difficult for the user to select the angle information while viewing the direction (angle) of the displayed character.

The reason therefor is similar to the reason described above for setting of the direction (angle) of the character in the glyph registration, and, in the present exemplary embodiment, the direction setting button corresponding to the same direction as the direction (angle) of the character is selected.

As indicated in the setting item 911, the direction setting button 912 corresponding to the same direction as the direction of the character in the data inspection area 908 is selected by the user.

After selecting the character in the data inspection area 908, the user selects the direction setting button 915 corresponding to the same direction as the direction of the barcode, for the data inspection area 917.

Here, the direction setting buttons 912 to 915 each have angle information in a table illustrated in FIG. 12. The direction setting buttons 912, 913, 914 and 915 correspond to direction setting buttons 1201, 1202, 1203, and 1204, and to 0 degrees, 90 degrees, 180 degrees, and 270 degrees, respectively, indicated as the angle information. The angle information is used at the time of inspection to be described below.

In the present exemplary embodiment, the angle to be set is based on 90-degree increments, and the angle is based on the sheet conveyance direction. As described above, the sheet conveyance direction is the left direction viewed from the UI screen for glyph registration illustrated in FIG. 7, and thus the angle information corresponding to the direction setting button 1201 is 0 degrees.

The setting indicating the direction (angle) of the character is not limited to the direction setting buttons 912 to 915, and may be, for example, radio buttons.

After performing the setting for the printed image inspection, the setting for the character/barcode inspection, and the setting for the selected area, the user presses an OK button 916. When the OK button 916 is pressed by the user, the set values of the inspection setting are stored in the RAM 303.

The flowchart in FIG. 6 will now be described with reference to FIG. 9 described above.

In step S601, the user changes the reference image as appropriate.

When changing the reference image, the user presses the button 901 for changing the reference image. In step S602, the user selects the printed image inspection area, using the button 902 for selecting the inspection area. The printed image inspection area is an inspection area for detecting a defect of a pattern portion of a print product.

In step S603, the user performs setting for the printed image inspection. In FIG. 9, the user sets the inspection level for each of the defect (dot) and the defect (streak), using the setting item 906.

In step S604, the user sets the data for collation inspection. In FIG. 9, the user selects the file, using the setting item 910. In step S605, the user selects the data inspection area, using the button 902 for selecting the inspection area. In FIG. 9, the data inspection area 908 and the data inspection area 917 are selected.

In step S606, the user performs the setting for the selected area, using the setting item 911. In FIG. 9, the direction setting button 912 corresponding to the same direction as the direction (angle) of the character in the data inspection area 908 is selected. After selecting the character in the data inspection area 908, the user selects the direction setting button 915 corresponding to the same direction as the direction (angle) of the barcode in the data inspection area 917.

In step S607, when the user presses the OK button 916, the inspection setting is stored. The user makes the inspection setting by performing the above-described work. Step S602 to step S606 may be performed in random order.

An operation of the inspection apparatus 110 after the inspection setting will now be described. When an inspection start button (not illustrated) displayed on the UI unit 320 is pressed by the user, the inspection apparatus 110 executes inspection using the inspection processing unit 305.

An operation of the inspection processing unit 305 will be described with reference to the inspection setting in FIG. 9 and a flowchart in FIG. 10.

In step S1001, the inspection processing unit 305 detects each of a defect (dot) and a defect (streak) included in the sheet, as a defect at the time of printing, based on the inspection setting performed by the user. A known technique may be used for a detection method, and thus the description of the detection method will be omitted.

Figure 9:
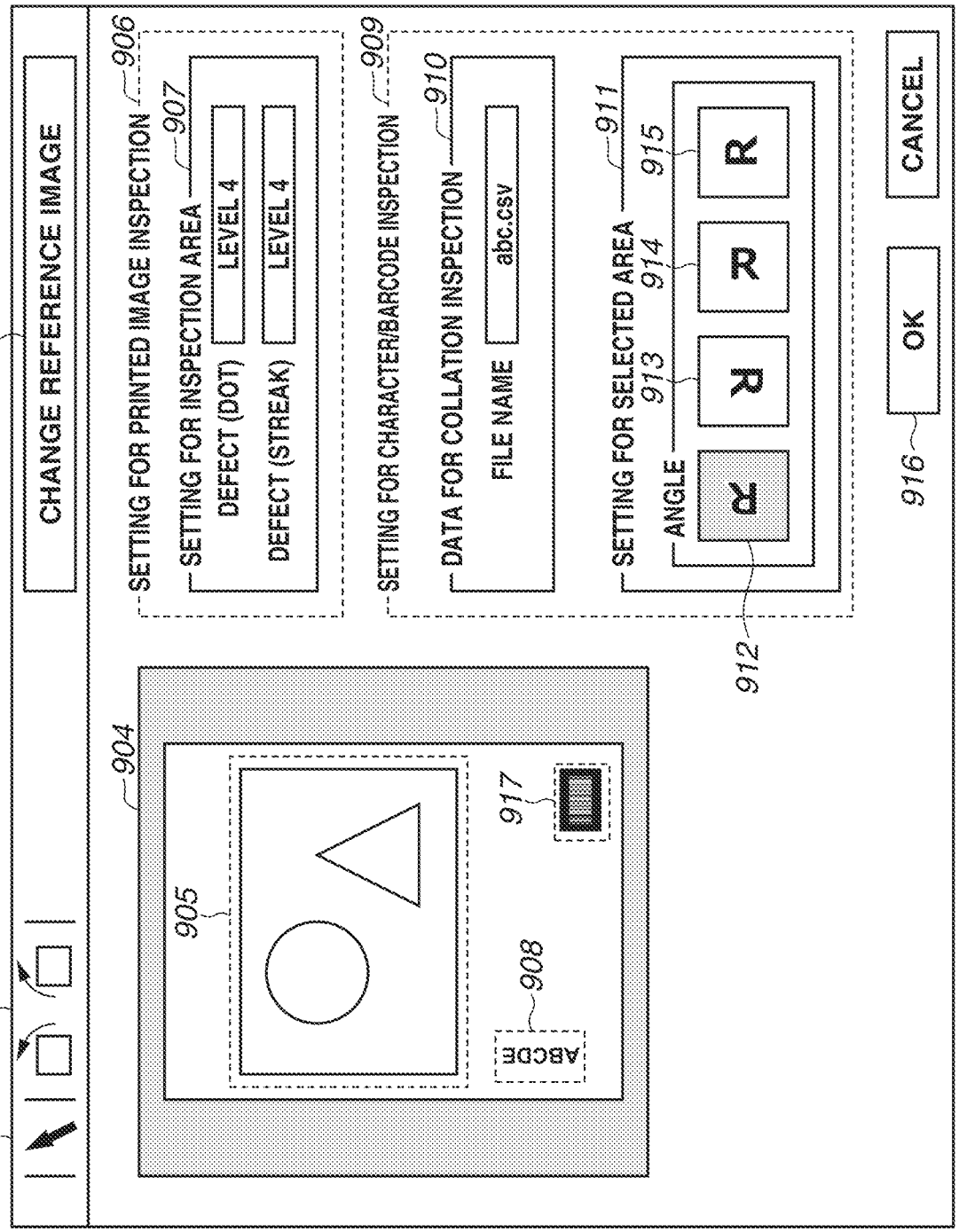
FIG. 9 illustrates an example of a UI screen for inspection setting.
Figure 10:
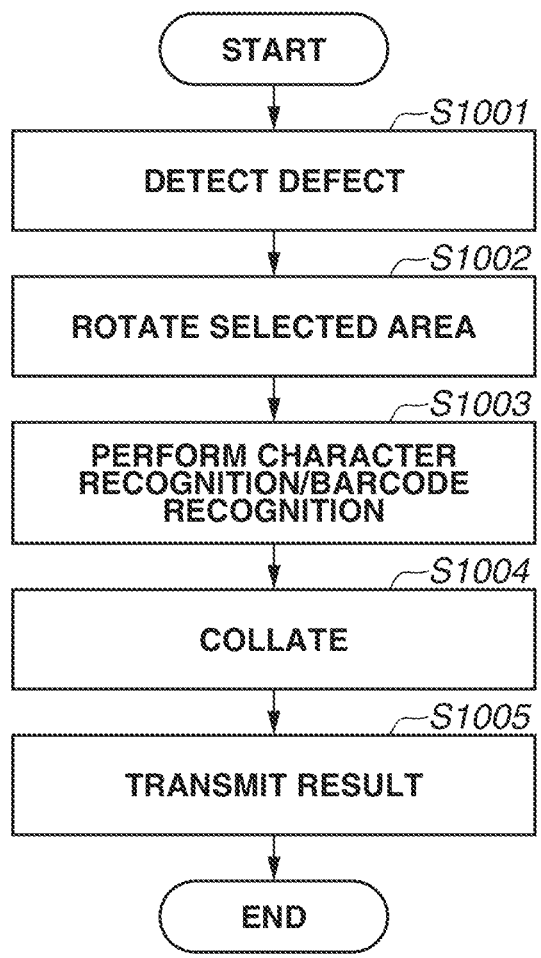
FIG. 10 illustrates a flowchart of inspection.

In step S1002, the inspection processing unit 305 rotates the area selected in step S605, the character in the data inspection area 908, and the barcode in the data inspection area 917 in FIG. 9, based on the direction (angle) set in step S504 and the direction (angle) set in step S606. In other words, the user rotates the selected area such that the direction (angle) set in the inspection setting and the direction (angle) set in the glyph registration match each other. Here, the method for rotating the selected area will be described in detail.

First, the case of the character will be described. As described above, the direction (angle) set in step S504 is the direction indicated by the direction setting button 710. This corresponds to the direction setting button 1104 in FIG. 11A, and the angle information is 270 degrees. Further, the direction (angle) set in step S606 is the direction indicated by the direction setting button 912. This corresponds to the direction setting button 1201 in FIG. 12, and the angle information is 0 degrees. In this situation, the direction (angle) set in the inspection setting and the direction (angle) set in the glyph registration are different, and thus the selected area may be rotated counterclockwise 270 degrees (or clockwise 90 degrees) to make these directions match each other.

Next, the case of the barcode will be described. For the barcode, the direction (angle) is not set in the glyph registration, and thus the reference direction (angle) is determined beforehand. Here, the direction indicated by the direction setting button 1105 in FIG. 11B is the reference direction. Meanwhile, the direction (angle) set in step S606 is the direction indicated by the direction setting button 915. In this situation, the direction (angle) set in the inspection setting and the reference direction (angle) are different, and thus the selected area may be rotated counterclockwise 90 degrees to make these directions match each other.

In step S1003, the inspection processing unit 305 performs character separation, and character recognition/barcode recognition, for the area rotated in step S1002. Here, the glyph registration is used for the character recognition.

In step S1004, the inspection processing unit 305 collates the character recognition result and the barcode recognition result obtained in step S1003, with the correct character strings listed in the reference CSV file. Subsequently, the inspection processing unit 305 outputs a correctness/incorrectness determination result, as an inspection result.

In step S1005, the inspection processing unit 305 transmits the inspection result obtained in step S1004 to the UI unit 320.

Here, upon receiving the inspection result, the UI unit 320 displays the scanned image of the inspection target and the inspection result, for the user. In a case where a print product has a defect, the UI unit 320 emphasizes the detected defect using a dotted line frame or a color frame on the scanned image, and displays the type (dot or streak), the position information, and the like of the detected defect, together with the detected defect. On the other hand, in a case where a print product has no defect, the character string having no defect is displayed. The method for displaying the inspection result by the UI unit 320 is not limited to these examples. The method may be any method if the method can display the detection result for the user in an easy-to-understand manner.

Further, the inspection processing unit 305 transmits the inspection result obtained in step S1004, also to the image forming apparatus 100 and the finisher 120. The information transmitted to the image forming apparatus 100 is information indicating that a predetermined number or more of print products each having a defect are produced in succession, and the information transmitted to the finisher 120 is information about whether a print product has a defect.

As described above, upon receiving the above-described information, the image forming apparatus 100 suspends the print operation. Meanwhile, using the received information, the finisher 120 discharges a print product having no defect to the normal sheet discharge tray, and a print product having a defect to the tray which is different from the normal sheet discharge tray.

As described above, according to the present exemplary embodiment, the user selects the direction setting button corresponding to the same direction as the direction of the displayed character/barcode, so that the character recognition or decoding of the barcode can be performed based on the correct orientation, in the glyph registration setting and the inspection setting.

A second exemplary embodiment of the present disclosure will now be described.

A case where the reference image displayed in the display window 904 is rotated using the rotation button 903 for rotating the page preview will be described. In a case where the displayed image is rotated using the rotation button 903, a mismatch between the direction of the character in the selected data inspection area 908 and the direction of the selected button among the direction setting buttons 912 to 915 can occur. If the mismatch occurs, it is difficult for the user to perform setting, and if the direction (angle) is not correctly set, the character recognition and the barcode recognition can fail.

Therefore, in the second exemplary embodiment, there will be described a method in which, in a case where the displayed image is rotated, the selected button among the direction setting buttons 912 to 915 is updated, and the angle information table illustrated in FIG. 12 is also updated.

Figure 13:
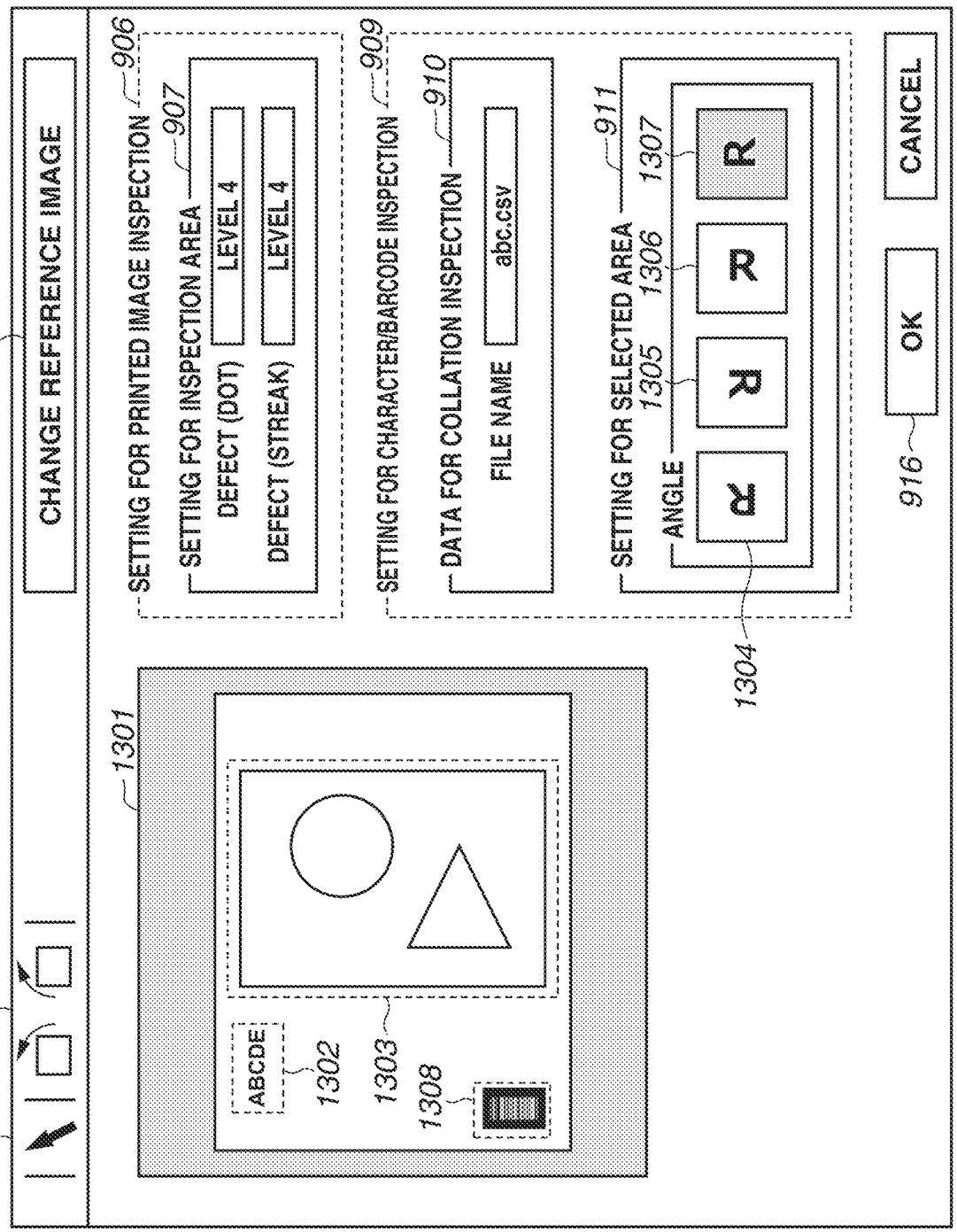
FIG. 13 illustrates an example of a UI screen for inspection setting according to one or more aspects of the present disclosure.

FIG. 13 illustrates an image obtained by rotating the reference image displayed in the display window 904 in FIG. 9, clockwise 90 degrees, using the rotation button 903 for rotating the page preview. Description will be omitted for the same reference numbers as those in FIG. 9, specifically, the buttons 901 to 903, the setting items 906 and 907, the setting items 909 to 911, and the OK button 916.

A display window 1301 displays a data inspection area 1302 indicating the character after the rotation, a printed image inspection area 1303 after the rotation, and a data inspection area 1308 indicating the barcode after the rotation.

Direction setting buttons 1304 to 1307 each indicate the direction (angle) of the character/barcode after the rotation.

First, the case of the character will be described. Before the rotation, the direction setting button 912 in FIG. 9 is selected, but after the rotation, the selected direction setting button is changed in accordance with the rotation direction, and the direction setting button 1307 in FIG. 13 is selected. FIG. 14 illustrates an angle information table after the rotation, and the angle information corresponding to the direction (angle) of the direction setting button is updated. For example, the angle information corresponding to the direction setting button 1201 in FIG. 12 is 0 degrees before the rotation. As described above, after the rotation, the selected button is changed from the direction setting button 1304 to the direction setting button 1307, and thus the angle information is 0 degrees as indicated by a direction setting button 1404 in FIG. 14. Thus, the angle information is 0 degrees both before and after the rotation.

Next, the case of the barcode will be described. Before the rotation, the direction setting button 915 in FIG. 9 is selected, but the direction setting button 1306 in FIG. 13 is selected (not illustrated) after the rotation. For example, the angle information corresponding to the direction setting button 1204 in FIG. 12 is 270 degrees before the rotation. As described above, after the rotation, the selected button is changed from the direction setting button 1307 to the direction setting button 1306, and thus the angle information is 270 degrees as indicated by a direction setting button 1403 in FIG. 14. Thus, the angle information is maintained to be 270 degrees both before and after the rotation.

In this way, even in a case where the displayed image is rotated, the direction (angle) of the displayed image and the direction setting button can be matched by updating the direction setting buttons 1304 to 1307 and the angle information table, which makes it easier for the user to make the setting. In addition, since the setting can be made using the correct direction (angle), the character recognition and the barcode recognition can be performed correctly.

According to the exemplary embodiments of the present disclosure, the character can be accurately recognized, and the accuracy of the inspection can be improved, even in a case where the direction of the registered character and the direction of the character in the image obtained by reading the print product as the inspection target are different.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-146111, filed Sep. 8, 2021, which is hereby incorporated by reference herein in its entirety.

What is claimed is:

1. An inspection apparatus that inspects a print product printed by a print apparatus, the inspection apparatus comprising:
    one or more controllers including one or more processors and one or more memories, the one or more controllers configured to:
    set at least one character area, in a first preview image obtained by reading and previewing the print product;
    set a first direction, for a character in the set character area, by selecting one image of a plurality of images indicating directions of a character, each of the plurality of images being images indicating different directions of a character;
    register the set first direction and the character in the set character area in association with each other;
    set at least one character inspection area, in a second preview image obtained by reading and previewing a print product as an inspection target;
    set a second direction, for a character in the set character inspection area, by selecting one image of a plurality of images indicating directions of a character, each of the plurality of images being images indicating different directions of a character;
    rotate the character inspection area to match the set first direction, with the set second direction;
    perform character recognition using the registered character, for the character in the rotated character inspection area; and
    inspect the character in the character inspection area, based on a result of the character recognition and reference data.

2. The inspection apparatus according to claim 1, wherein a user interface for a user to select an image whose orientation is same as an orientation of a displayed image.

3. The inspection apparatus according to claim 2, wherein angle information is associated with the orientation of the image.

4. The inspection apparatus according to claim 1, wherein the character recognition is performed using a glyph font registered.

5. The inspection apparatus according to claim 1, wherein the recognition further recognizes a barcode.

6. The inspection apparatus according to claim 5, wherein the inspection unit collates a result of recognizing the barcode with correct data.

7. The inspection apparatus according to claim 1, wherein angle information is stored in association with the direction of the character.

8. A control method in an inspection apparatus that receives a print product printed by a print apparatus and inspects the received print product, the control method comprising:
    performing first selection to select at least one character area, in a first preview image obtained by reading and previewing the print product;
    performing first setting to set a first direction, for a character in the selected character area, by selecting one image of a plurality of images indicating directions of a character, each of the plurality of images being images indicating different directions of a character;
    performing registration of the set first direction and the character in the selected character area in association with each other;
    performing second selection to select at least one character inspection area, in a second preview image obtained by reading and previewing a print product as an inspection target;
    performing second setting to set a second direction, for a character in the selected character inspection area, by selecting one image of a plurality of images indicating directions of a character, each of the plurality of images being images indicating different directions of a character;
    rotating the character inspection area to match the set first direction with the set second direction;
    performing recognition as character recognition using the registered character, for the character in the rotated character inspection area; and
    performing inspection of the character in the character inspection area, based on a result of the character recognition and the reference data.

9. The control method according to claim 8, wherein each of the first setting and the second setting is a user interface for a user to select an image whose orientation is same as an orientation of a displayed image.

10. The control method according to claim 9, wherein angle information is associated with an orientation of the image.

11. The control method according to claim 8, wherein the character recognition is performed using a glyph font registered in the registration.

12. The control method according to claim 8, wherein a barcode is further recognized in the recognition.

13. The control method according to claim 12, wherein a result of recognizing the barcode is collated with correct data in the inspection.

14. The inspection apparatus according to claim 1, wherein the first direction and the second direction are set using an image indicating an orientation of a character.

\* \* \* \* \*